United States Patent
Xiao et al.

(10) Patent No.: US 12,131,093 B2
(45) Date of Patent: Oct. 29, 2024

(54) METHOD FOR ELIMINATING SPLICING GAP OF SPLICING SCREENS AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Juncheng Xiao, Guangdong (CN); Meinan Li, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/622,807

(22) PCT Filed: Dec. 20, 2021

(86) PCT No.: PCT/CN2021/139778
§ 371 (c)(1),
(2) Date: Dec. 25, 2021

(87) PCT Pub. No.: WO2023/103075
PCT Pub. Date: Jun. 15, 2023

(65) Prior Publication Data
US 2024/0028286 A1    Jan. 25, 2024

(30) Foreign Application Priority Data
Dec. 10, 2021  (CN) .......................... 202111508804.9

(51) Int. Cl.
*G06F 3/14* (2006.01)

(52) U.S. Cl.
CPC .................................. *G06F 3/1446* (2013.01)

(58) Field of Classification Search
CPC .................. G06F 3/01446; G09G 3/20; G09G 2300/026; G09G 2320/0233
See application file for complete search history.

(56) References Cited

U.S. PATENT DOCUMENTS

2016/0266437 A1* 9/2016 Liu .................. G02F 1/133524
2016/0267860 A1* 9/2016 Liu .......................... G09G 3/32
(Continued)

FOREIGN PATENT DOCUMENTS

| CN | 104091522 A | 10/2014 |
| CN | 104851373 A | 8/2015 |

(Continued)

OTHER PUBLICATIONS

International Search Report in International application No. PCT/CN2021/139778, mailed on Aug. 1, 2022.
(Continued)

*Primary Examiner* — Adam J Snyder
(74) *Attorney, Agent, or Firm* — PV IP PC; Wei Te Chung

(57) ABSTRACT

A method for eliminating a splicing gap of splicing screens and a display device are provided. The method includes: acquiring a first pixel value and a second pixel value; acquiring an image to be displayed; acquiring a first display area and a second display area; determining a first display image and a second display image according to the first display area, the second display area, and the image to be displayed if an edge area is adjusted from the first pixel value to the second pixel value; and displaying the first display image and the second display image.

20 Claims, 4 Drawing Sheets

(56) References Cited

U.S. PATENT DOCUMENTS

2018/0184066 A1    6/2018  Salahieh et al.
2021/0366411 A1   11/2021  Yang et al.

FOREIGN PATENT DOCUMENTS

| | | | | |
|---|---|---|---|---|
| CN | 105453159 A | | 3/2016 | |
| CN | 105867865 A | | 8/2016 | |
| CN | 108989775 A | | 12/2018 | |
| CN | 109992226 A | | 7/2019 | |
| CN | 110716703 A | | 1/2020 | |
| CN | 111108469 A | | 5/2020 | |
| CN | 111258527 A | | 6/2020 | |
| CN | 111312084 A | | 6/2020 | |
| CN | 111312085 A | * | 6/2020 | ............... G09F 9/33 |
| JP | 2021128402 A | | 9/2021 | |

OTHER PUBLICATIONS

Written Opinion of the International Search Authority in International application No. PCT/CN2021/139778, mailed on Aug. 1, 2022.
Chinese Office Action issued in corresponding Chinese Patent Application No. 202111508804.9 dated Jan. 31, 2024, pp. 1-9.

* cited by examiner

METHOD FOR ELIMINATING SPLICING GAP OF SPLICING SCREENS AND DISPLAY DEVICE

FIELD OF DISCLOSURE

The present disclosure relates to the field of display technologies, in particular to a method for eliminating a splicing gap of splicing screens and a display device.

BACKGROUND

A market size of splicing display screens has grown year by year. Liquid crystal display (LCD) splicing screens occupy a low-end market with a price advantage. In a high-end market, light-emitting diodes (LEDs) with small splicing gaps are mainstream products. The splicing gap is a main bottleneck restricting the LCD splicing screens from entering high-end products. The development of the LCD splicing screens with a zero-splicing gap can enhance product competitiveness. Also, with the advantages of price and no splicing gap, they seize an LED indoor high-end market, such as broadcasting media, big data centers, etc., and expand into the LCD borderless field. Therefore, the splicing gap of the LCD splicing screens has become a key breakthrough point that needs to be solved urgently.

SUMMARY OF DISCLOSURE

A market size of splicing display screens has grown year by year. LCD splicing screens occupy a low-end market with a price advantage. However, there is a splicing gap in the splicing LCDs, which affects the display performance.

Embodiments of the present disclosure provide a method for eliminating a splicing gap of splicing screens and a display device, which are used to solve a difference in pixel sizes of the splicing screens, thereby improving a quality of the splicing display screens.

In a first aspect, an embodiment of the present disclosure provides a method for eliminating a splicing gap of splicing screens, including:
  acquiring a first pixel value of a first display screen and a second pixel value of a second display screen, wherein the second display screen is adjacent to the first display screen;
  acquiring an image to be displayed;
  acquiring a first display area of the first display screen and a second display area of the second display screen;
  if a pixel value of an edge area is adjusted from the first pixel value to the second pixel value according to a preset configuration parameter along an extension direction of the first display screen to the second display screen, determining a first display image of the first display screen and a second display image of the second display screen according to the first display area, the second display area, and the image to be displayed, wherein the edge area is an area in the first display screen and adjacent to the second display screen;
  if the pixel value of the edge area is not adjusted from the first pixel value to the second pixel value, determining a pixel ratio according to the first pixel value and the second pixel value;
  determining the first display image of the first display screen and the second display image of the second display screen according to the pixel ratio, the first display area, the second display area, and the image to be displayed;
  adjusting parameters of the first display image and the second display image to a preset display state; and
  controlling the first display screen to display the first display image, and controlling the second display screen to display the second display image.

In this embodiment, a pixel size is gradually changed from large to small or small to large in the edge area of the first display screen to weaken a visual difference at the splicing gap of the first display screen and the second display screen. Alternatively, based on the difference between the pixel value of the first pixel value of the first display screen and the pixel value of the second pixel value of the second display screen, a display area of the image to be displayed is allocated to weaken the visual difference at the splicing gap of the first display screen and the second display screen. Furthermore, the pixel ratio of the first pixel value of the first display screen and the second pixel value of the second display screen is calculated. Regardless of whether the pixel value of the first display screen to the first display screen changes from large to small or from small to large, the display area of the image to be displayed is allocated based only on the pixel ratio to reduce factors that need to be considered. The visual difference at the splicing gap of the first display screen and the second display screen is weakened.

In some embodiments, the step of determining the first display image of the first display screen and the second display image of the second display screen according to the pixel ratio, the first display area, the second display area, and the image to be displayed includes:
  determining a first display proportion of the first display screen and a second display proportion of the second display screen according to the pixel ratio, the first display area, and the second display area; and
  determining the first display image and the second display image according to the first display proportion and the second display proportion.

In this embodiment, based on the pixel ratio of the first pixel value of the first display screen and the second pixel value of the second display screen, a ratio of image sizes corresponding to each pixel unit in the first display screen and the second display screen is determined. Thus, the display area of the image to be displayed is allocated to weaken the visual difference at the splicing gap of the first display screen and the second display screen.

In some embodiments, the step of adjusting the pixel value of the edge area from the first pixel value to the second pixel value according to the preset configuration parameter along the extension direction of the first display screen to the second display screen includes:
  calculating a pixel difference value of the first pixel value and the second pixel value;
  determining the edge area according to preset pixel value intervals and the pixel difference value; and
  adjusting a size of a pixel of the edge area from the first pixel value to the second pixel value according to the preset pixel value intervals along the extension direction of the first display screen to the second display screen.

In this embodiment, the edge area is determined through the preset pixel value intervals. The preset pixel value intervals can be set according to different display requirements or the size of the display screen. The preset pixel value intervals can be fixed intervals or intervals that vary according to a certain function. The smaller the preset pixel value interval, the less obvious the change in pixel size in the edge area, and the smaller the visual difference.

In some embodiments, the step of adjusting the size of the pixel of the edge area from the first pixel value to the second pixel value according to the preset pixel value intervals includes:
  determining a target value of each pixel in the edge area according to the preset pixel value intervals, the first pixel value, and the second pixel value; and
  adjusting each pixel to the target value.

In this embodiment, because the preset pixel value intervals can be set according to their own needs, after determining the edge area based on the preset pixel value intervals, the target value that each pixel in the edge area needs to be adjusted to is accurately analyzed to make each pixel value clear. If there is a pixel value error, the fault can be quickly located.

In some embodiments, the step of adjusting each pixel to the target value includes:
  adjusting each pixel to the target value by adjusting a size of a black matrix area or a data line.

In this embodiment, since the size of the black matrix area or the data line is a factor that affects a light transmission range of the pixel area, the size of each pixel can be directly adjusted by adjusting the size of the black matrix area or the data line to achieve the target value of each pixel more accurately.

In a second aspect, an embodiment of the present disclosure provides a method for eliminating a splicing gap of splicing screens, including:
  acquiring a first pixel value of a first display screen and a second pixel value of a second display screen, wherein the second display screen is adjacent to the first display screen;
  acquiring an image to be displayed;
  acquiring a first display area of the first display screen and a second display area of the second display screen;
  if a pixel value of an edge area is adjusted from the first pixel value to the second pixel value according to a preset configuration parameter along an extension direction of the first display screen to the second display screen, determining a first display image of the first display screen and a second display image of the second display screen according to the first display area, the second display area, and the image to be displayed, wherein the edge area is an area in the first display screen and adjacent to the second display screen;
  if the pixel value of the edge area is not adjusted from the first pixel value to the second pixel value, determining the first display image of the first display screen and the second display image of the second display screen according to the first pixel value, the second pixel value, the first display area, the second display area, and the image to be displayed; and
  controlling the first display screen to display the first display image, and controlling the second display screen to display the second display image.

In this embodiment, a pixel size is gradually changed from large to small or small to large in the edge area of the first display screen to weaken a visual difference at the splicing gap of the first display screen and the second display screen. Alternatively, based on the difference between the pixel value of the first pixel value of the first display screen and the pixel value of the second pixel value of the second display screen, a display area of the image to be displayed is allocated to weaken the visual difference at the splicing gap of the first display screen and the second display screen.

In some embodiments, the step of determining the first display image of the first display screen and the second display image of the second display screen according to the first pixel value, the second pixel value, the first display area, the second display area, and the image to be displayed includes:
  determining a pixel ratio according to the first pixel value and the second pixel value; and
  determining the first display image of the first display screen and the second display image of the second display screen according to the pixel ratio, the first display area, the second display area, and the image to be displayed.

In this embodiment, the pixel ratio of the first pixel value of the first display screen and the second pixel value of the second display screen is calculated. Regardless of whether the pixel value of the first display screen to the first display screen changes from large to small or from small to large, the display area of the image to be displayed is allocated based only on the pixel ratio to adjust the display area to reduce factors that need to be considered. The visual difference at the splicing gap of the first display screen and the second display screen is weakened.

In some embodiments, the step of controlling the first display screen to display the first display image, and controlling the second display screen to display the second display image includes:
  controlling one of the first display screen and the second display screen with a larger pixel value to display a corresponding display image; and
  enlarging the display image corresponding to one of the first display screen and the second display screen with a smaller pixel value according to the pixel ratio, and controlling one of the first display screen and the second display screen with the smaller pixel value to display.

In this embodiment, by adjusting a size of the display image of one of the first display screen and the second display screen with the smaller pixel value, visual display effects of the first display screen and the second display screen are the same. The visual difference at the splicing gap of the first display screen and the second display screen is weakened.

In some embodiments, the step of determining the first display image of the first display screen and the second display image of the second display screen according to the pixel ratio, the first display area, the second display area, and the image to be displayed includes:
  determining a first display proportion of the first display screen and a second display proportion of the second display screen according to the pixel ratio, the first display area, and the second display area; and
  determining the first display image and the second display image according to the first display proportion and the second display proportion.

In this embodiment, based on the pixel ratio of the first pixel value of the first display screen and the second pixel value of the second display screen, a ratio of a displayed image size corresponding to each pixel unit in the first display screen and the second display screen is determined. Thus, the display area of the image to be displayed is allocated to weaken the visual difference at the splicing gap of the first display screen and the second display screen.

In some embodiments, the step of determining the first display proportion of the first display screen and the second display proportion of the second display screen according to the pixel ratio, the first display area, and the second display area includes:
  determining a display proportion ratio of the first display screen and the second display screen according to the pixel ratio, the first display area, and the second display area;
  acquiring a number of display screens of the first display screen and the second display screen;
  determining that first display proportion of the first display screen and the second display proportion of the second display screen according to the display proportion ratio and the number of the display screens.

In this embodiment, first, the display proportion ratio of the first display screen and the second display screen is determined based on parameters of one screen, and then the number of display screens of all the first display screens and the second display screens are combined to divide the image to be displayed. It ensures that all display screens cooperate to display a complete image to be displayed.

In some embodiments, the step of adjusting the pixel value of the edge area from the first pixel value to the second pixel value according to the preset configuration parameter along the extension direction of the first display screen to the second display screen includes:
  calculating a pixel difference value of the first pixel value and the second pixel value;
  determining the edge area according to preset pixel value intervals and the pixel difference value; and
  adjusting a size of a pixel of the edge area from the first pixel value to the second pixel value according to the preset pixel value intervals along the extension direction of the first display screen to the second display screen.

In this embodiment, the edge area is determined through the preset pixel value intervals. The preset pixel value intervals can be set according to different display requirements or the size of the display screen. The preset pixel value intervals can be fixed intervals or intervals that vary according to a certain function. The smaller the preset pixel value interval, the less obvious the change in pixel size in the edge area, and the smaller the visual difference.

In some embodiments, the preset pixel value intervals are set at even intervals.

In this embodiment, the preset pixel value intervals are set at even intervals, which is convenient to control the change of pixels. The smaller the preset pixel value interval, the more refined the adjustment.

In some embodiments, the preset pixel value intervals are set at random intervals.

In this embodiment, the preset pixel value intervals are set at random intervals, and may also be increased or decreased according to a certain rule to better match a curve showing brightness variances for different viewing angles.

In some embodiments, the step of adjusting the size of the pixel of the edge area from the first pixel value to the second pixel value according to the preset pixel value intervals includes:
  increasing the size of the pixel of the edge area from the first pixel value to the second pixel value according to the preset pixel value intervals along the extension direction of the first display screen to the second display screen; or
  decreasing the size of the pixel of the edge area from the first pixel value to the second pixel value according to the preset pixel value intervals along the extension direction of the first display screen to the second display screen.

In this embodiment, no matter the pixel value of the first display screen to the first display screen changes from large to small or from small to large, the size of the pixel of the edge area is adjusted according to the preset pixel value intervals, which is suitable for more scenes.

In some embodiments, the step of adjusting the size of the pixel of the edge area from the first pixel value to the second pixel value according to the preset pixel value intervals includes:
  determining a target value of each pixel in the edge area according to the preset pixel value intervals, the first pixel value, and the second pixel value; and
  adjusting each pixel to the target value.

In this embodiment, because the preset pixel value intervals can be set according to their own needs, after determining the edge area based on the preset pixel value intervals, the target value that each pixel in the edge area needs to be adjusted to is accurately analyzed to make each pixel value clear. If there is a pixel value error, the fault can be quickly located.

In some embodiments, the step of adjusting each pixel to the target value includes:
  adjusting each pixel to the target value by adjusting a size of a black matrix area or a data line.

In this embodiment, since the size of the black matrix area or the data line is a factor that affects a light transmission range of the pixel area, the size of each pixel can be directly adjusted by adjusting the size of the black matrix area or the data line to achieve the target value of each pixel more accurately.

In some embodiments, before the step of controlling the first display screen to display the first display image, and controlling the second display screen to display the second display image, the method includes:
  adjusting parameters of the first display image and the second display image to a preset display state.

In this embodiment, since light-emitting principles of the first display screen and the second display screen are different, the brightness and chromaticity are different. When spliced together, the effect of complete fusion cannot be achieved. Therefore, it is necessary to adjust brightness, chroma, and other parameters of the first display image and the second display image correspondingly, so that the display performances of the two are the same.

In some embodiments, the step of determining the first display image of the first display screen and the second display image of the second display screen according to the first display area, the second display area, and the image to be displayed includes:
  determining a ratio of the first display screen to the second display screen according to the first display area and the second display area;
  acquiring a number of display screens of the first display screen and the second display screen; and
  determining the first display image of the first display screen and the second display image of the second display screen according to the ratio and the number of the display screens.

In this embodiment, first, the display proportion ratio of the first display screen and the second display screen is determined based on parameters of one screen, and then the number of display screens of all the first display screens and the second display screens are combined to divide the image to be displayed. It ensures that all display screens cooperate to display a complete image to be displayed.

In a third aspect, the present disclosure provides a display device. The display device includes a plurality of first display screens. A splicing gap is formed between two of the first display screens. The display device further includes a second display screen disposed at the splicing gap and a device for eliminating a splicing gap of splicing screens as mentioned above. The device for eliminating the splicing gap of the splicing screens is connected to the first display screen and the second display screen.

In this embodiment, the first display screen is a liquid crystal display (LCD) display screen, and the second display screen is a mini-LED display screen.

In the method for eliminating the splicing gap of the splicing screens and the display device of the embodiments of the present disclosure, in the edge area of the first display screen, the pixel size is gradually changed from large to small or small to large in the edge area to weaken the visual difference at the splicing gap of the first display screen and the second display screen. Alternatively, based on the difference between the pixel value of the first pixel value of the first display screen and the pixel value of the second pixel value of the second display screen, the display area of the image to be displayed is allocated. The pixel size difference between the first display screen and the second display screen is improved from the display effect, thereby improving the quality of the spliced display screen.

BRIEF DESCRIPTION OF DRAWINGS

The following describes the specific implementation of the present disclosure in detail with reference to the accompanying drawings to make the technical solution and other beneficial effects of the present disclosure obvious.

DETAILED DESCRIPTION

Figure 1:
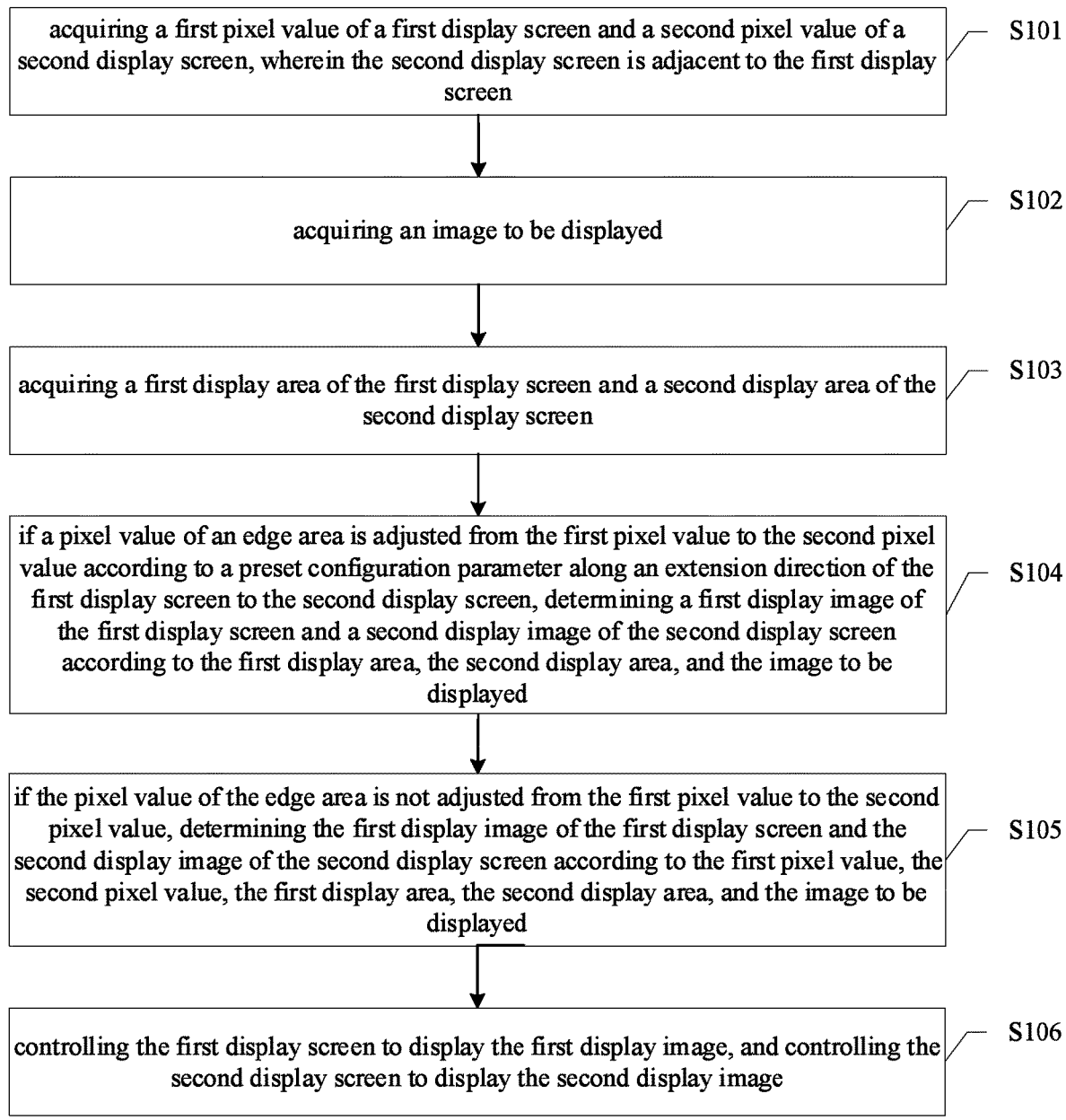
FIG. 1 is a flowchart of a method for eliminating a splicing gap of splicing screens in an embodiment of the present disclosure.

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

In the description of the present disclosure, it should be understood that directions or location relationships indicated by terms "center", "longitudinal", "transverse", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure. In addition, terms "first" and "second" are merely used to describe the objective, but cannot be understood as indicating or implying relative importance or implying a quantity of indicated technical features. Therefore, features limited by "first" and "second" may indicate explicitly or implicitly that one or more features are included. In the description of the present disclosure, unless otherwise specifically limited, "multiple" means at least two.

In the present disclosure, unless otherwise clearly stipulated and limited, terms "mount", "connect", and "fix" should be understood in a generalized manner, for example, may be understood as fixed connection, detachable connection, or integration; or may be understood as mechanical connection, electrical connection, or mutual communication; or may be understood as direct connection, or indirect connection with a medium, or internal communication of two elements or a mutual relationship between two elements. A person of ordinary skill in the art may understand specific meanings of the terms in the present disclosure according to specific situations.

In the present disclosure, unless otherwise clearly stipulated and limited, that a first feature is "above" or "below" a second feature may include that the first feature directly contacts the second feature, or may include that the first feature does not contact the second feature directly but contacts the second feature with another feature between them. In addition, that the first feature is "above" the second feature includes that the first feature is right above the second feature and is not right above the second feature, or merely represents that a horizontal height of the first feature is higher than the second feature. That the first feature is "below" the second feature includes that the first feature is right below the second feature and is not right below the second feature, or merely represents that a horizontal height of the first feature is lower than the second feature.

The disclosure of the following description provides many different embodiments or examples for realizing different structures of the present application. In order to simplify the disclosure of the present application, described below are components and settings of specific examples. Of course, they are only examples, and are not aimed at limiting the present application. Moreover, the present application can repeat reference numbers and/or reference letters in different examples, but such repetition is for the sake of simplification and clearness, and it does not indicate the relation between various embodiments and/or settings discussed. Furthermore, the present application provides the examples of various specific processes and materials, but the ordinary skilled persons in the art could conceive of application of other processes and/or usage of other materials.

Referring to FIG. 1, an embodiment of the present disclosure provides a method for eliminating a splicing gap of splicing screens, and the method includes steps S101 to S106, which are specifically as follows:

S101, a first pixel value of a first display screen and a second pixel value of a second display screen are acquired. The second display screen is adjacent to the first display screen.

The splicing gap of liquid crystal splicing screens refers to a splicing gap formed by the splicing of two screens. Because a single LCD splicing display screen has a black border of several millimeters around it, a black border will be formed between the screen and the screen after splicing, resulting in a different number of horizontal and vertical lines in a display image. This black line is often referred to as the splicing gap. At present, 0 mm seamless LCD splicing screens are mainly based on original LCD splicing products with special macro-LED light-emitting strips added to the left and top of the screen. Using intelligent edge color restoration technology, and adopting high-transparency lens for packaging, the image hidden by the black border can be displayed again through the fusion with the original image.

A display device is formed by splicing several first display screens. A splicing gap is formed between two adjacent first display screens. The displayed image is separated by the splicing gap in the middle. Therefore, the display device also includes the second display screen disposed at the splicing gap. The second display screen is used to fill the splicing gap. The first display screen is an LCD display screen. The second display screen is a mini-LED display screen. The second display screen is directly attached between the first display screens to eliminate the splicing gap. However, due to different light-emitting principles of LCD and LED, the brightness and chromaticity are different, and the pixel size is also different. When spliced together, the effect of complete integration cannot be achieved. Therefore, the pixel size difference of splicing screens needs to be further improved.

The first pixel value of the first display screen and the second pixel value of the second display screen are acquired. The first pixel value and the second pixel value are a size of a single pixel in the display screen. For example, a resolution of the first display screen (LCD55FHD) is 1920*1080, and the corresponding first pixel value is 630*630 um. The second display screen is adjacent to the first display screen. The displayed images of the second display screen and the first display screen are connected. That is, the second display screen and the first display screen display the one image together.

It should be noted that this embodiment only takes the smallest display unit formed by the first display screen and the second display screen as an example for description. In fact, the other edge of the first display screen can be connected to other second display screen. Similarly, the other edge of the second display screen can also be connected to other first display screen. The number of first display screens and second display screens included in the display device is not specifically limited in this embodiment.

S102, an image to be displayed is acquired.

Specifically, the image to be displayed is acquired. The image to be displayed is an image suitable for display on the display device, which needs to meet the requirements of the display device in terms of resolution, format, etc., which is not specifically limited in this embodiment. In addition, the display device can also display video. The image to be displayed in this embodiment may also be a video frame image in a video. This embodiment uses any image to be displayed as an example to illustrate an adjustment process. Correspondingly, each frame of the video is processed in the same way to ensure that the display device can achieve the same effect when playing the video.

S103, a first display area of the first display screen and a second display area of the second display screen are acquired.

Specifically, the display device displays images together through the first display screen and the second display screen that are spliced by multiple pieces. That is, all the first display screens and the second display screens in the display device cooperate to display a complete image to be displayed. Therefore, the image to be displayed is divided into blocks based on the size of the display area of all the display screens (including the first display screen and the second display screen) to ensure that the first display screen and the second display screen cooperate to display the image to be displayed. Therefore, the first display area of the first display screen and the second display area of the second display screen are acquired.

S104, if a pixel value of an edge area is adjusted from the first pixel value to the second pixel value according to a preset configuration parameter along an extension direction of the first display screen to the second display screen, a first display image of the first display screen and a second display image of the second display screen are determined according to the first display area, the second display area, and the image to be displayed. The edge area is an area in the first display screen and adjacent to the second display screen.

Specifically, the edge area is the area adjacent to the second display screen in the first display screen. Compared with the first display screen, the edge area is very small and can be ignored, so even the value of the pixel in the edge area changes. The first pixel value of the first display screen refers to a pixel value of an area other than the edge area in the first display screen. That is, the first pixel value of the first display screen refers to the pixel value of most areas in the first display screen. This pixel value is a fixed value.

Along the extension direction of the first display screen to the second display screen, the pixel size of the edge area is adjusted from the first pixel value to the second pixel value according to the preset configuration parameter. That is, a design of gradually changing weakens the visual difference between the first display screen and the second display screen. For example, when the pixel of the LCD is larger than the pixel of the mini-LED, the edge pixels of the LCD (close to the mini-LED accessory) are gradually changed from large to small, and the size of the pixel of the LCD gradually changes to the size of the pixel of the mini-LED. When the pixel of the LCD is smaller than the pixel of the LED, the edge pixels of the LCD (close to the mini-LED accessory) are gradually changed from small to large, and the size of the pixel of the LCD gradually changes to the size of the pixel of the mini-LED. The adjustment method of the pixel size is not specifically limited in this embodiment. In addition, if the extending direction from the first display screen to the second display screen is defined as a horizontal direction, the size of the pixels in the same column in a vertical direction in the edge area is the same.

The preset configuration parameter is adjusted from the first pixel value to the second pixel value. For example, increase or decrease according to the same interval difference, or increase or decrease according to a certain functional relationship. The preset configuration parameter is not specifically limited in this embodiment.

The edge area is the area adjacent to the second display screen in the first display screen. The edge area can be on the first display screen or the second display screen. However, the display device is generally composed of multiple pieces of first display screens spliced together. The second display screen is attached on the splicing gap. Therefore, the size of the second display screen is smaller. Thus, the edge area is arranged on the first display screen, that is, primary splicing screens (first display screen), rather than secondary splicing screens (second display screen) attached on the splicing gap. The edge area can be a preset fixed size area. For example, an area of 5 columns of pixels in the vertical direction is the edge area. The edge area can also be an area corresponding to the pixel difference value of the first pixel value and the second pixel value. For example, a mapping relationship between different pixel difference value and the size of the edge area is set, and it is determined according to the mapping relationship. The size of the edge area is not specifically limited in this embodiment.

After the pixel size of the edge area is adjusted from the first pixel value to the second pixel value, because the pixel size is changed from a hardware design level, the image to be displayed, the first display area of the first display screen, and the second display screen are acquired. second display area. The number of display screens of all first display screens and the second display screens are combined. Based on the first display area of the first display screen and the second display area of the second display screen, the image to be displayed is divided into blocks to determine the first display image of the first display screen and the second display image of the second display screen.

The display device displays images together through the first display screens and the second display screens that are spliced by multiple pieces. That is, all the first display screens and the second display screens in the display device cooperate to display a complete image to be displayed. Therefore, the image to be displayed is divided into blocks based on the size of the display area of all the display screens (including the first display screen and the second display screen) to ensure that the first display screen and the second display screen cooperate to display the image to be displayed. The display device includes at least two first display screens and one second display screen. The display device includes two first display screens and one second display screen for description. The first display area of the first display screen is 36 mm*48 mm, the second display area of the second display screen is 6 mm*48 mm, and the three display screens respectively display 6/13, 1/13, and 6/13 of the image to be displayed. The numerical values in this embodiment are given as examples for ease of understanding, and should not be construed as being limited to the actual situation.

It should be noted that, due to the different light-emitting principles of the LCD and the LED, there are differences in brightness and chromaticity. When spliced together, the effect of complete fusion cannot be achieved. Therefore, it is necessary to adjust the brightness, chroma, and other parameters of the divided image to make the two display effects the same.

Figure 2:
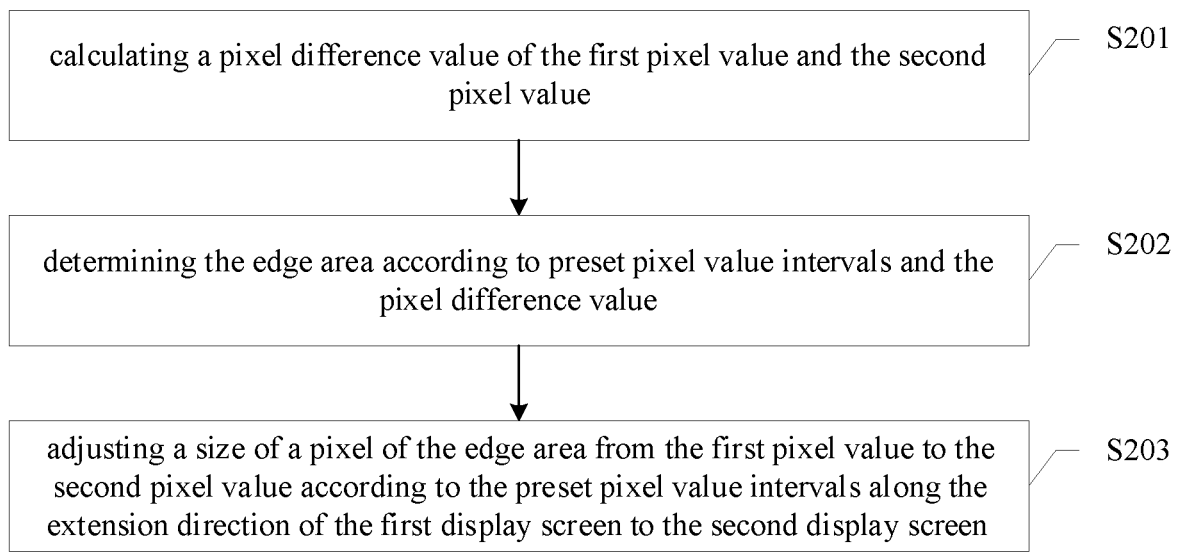
FIG. 2 is a flowchart of a method for eliminating a splicing gap of splicing screens in another embodiment of the present disclosure.

In one embodiment, as shown in FIG. 2, steps include: S201, a pixel difference value of the first pixel value and the second pixel value is calculated. S202, the edge area is determined according to preset pixel value intervals and the pixel difference value. S203, a size of a pixel of the edge area is adjusted from the first pixel value to the second pixel value according to the preset pixel value intervals along the extension direction of the first display screen to the second display screen.

Specifically, if the size of the edge area is not a fixed value, but depends on the pixel difference value of the first pixel value and the second pixel value, the pixel difference value of the first pixel value and the second pixel value is calculated, and then the preset pixel value intervals are acquired. The preset pixel value intervals can be fixed values that are evenly spaced. That is, when the first pixel value is adjusted to the second pixel value, the pixel value of the same size is increased or decreased each time. The preset pixel value intervals may not be fixed values, may be random intervals, or may increase or decrease according to a certain rule, for example, increase or decrease according to a proportional or arithmetic sequence.

Correspondingly, based on the setting of preset pixel value intervals, the edge area is not a fixed size. The edge area is determined according to the preset pixel value intervals and the pixel difference value. The number of pixel rows or columns required to adjust from the first pixel value to the second pixel value are determined based on the preset pixel value intervals and the pixel difference value, and then the edge area is determined. Along the extension direction of the first display screen to the second display screen, the size of the pixels of the edge area is adjusted from the first pixel value to the second pixel value according to the preset pixel value intervals.

Figure 3:
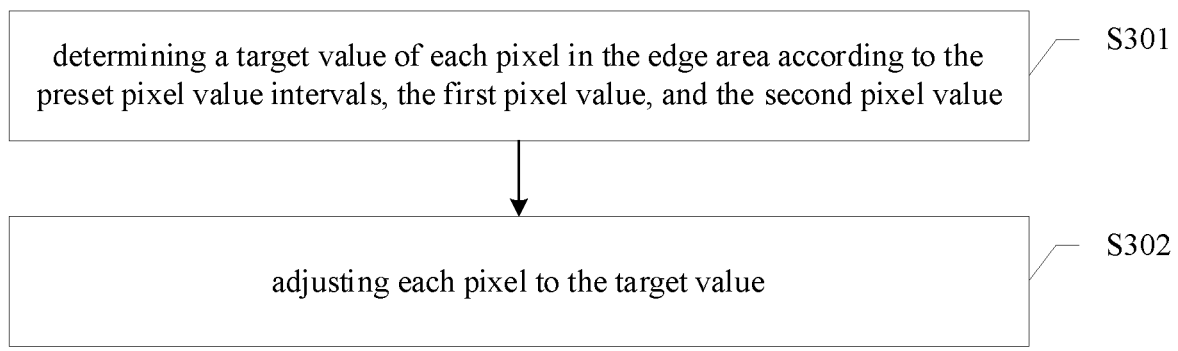
FIG. 3 is a flowchart of a method for eliminating a splicing gap of splicing screens in another embodiment of the present disclosure.

In one embodiment, as shown in FIG. 3, the step S203 of adjusting the size of the pixel of the edge area from the first pixel value to the second pixel value according to the preset pixel value intervals along the extension direction of the first display screen to the second display screen includes: S301, a target value of each pixel in the edge area is determined according to the preset pixel value intervals, the first pixel value, and the second pixel value; and S302, each pixel is adjusted to the target value.

Specifically, the target value of each pixel in the edge area is determined according to the preset pixel value intervals, the first pixel value, and the second pixel value. For example, the first pixel value of the first display screen (LCD55FHD) is 630*630 um. The second pixel value of the second display screen (mini-LED) is 900*900 um. The pixel difference value of the first pixel value and the second pixel value is 270 um. If the preset pixel value intervals are evenly spaced and 90 um, the number of rows or columns of the corresponding edge area (the number of rows or columns depends on the arrangement of the first display screen and the second display screen) is 2 rows. Along the extension direction of the first display screen to the second display screen, the value of each column or row of pixels in the edge area is: 720*720 um, 810*810 um. The pixels of each row or column are adjusted to the corresponding target value.

In one embodiment, the step S302 of adjusting each pixel to the target value includes: S401, each pixel is adjusted to the target value by adjusting a size of a black matrix area or a data line.

Specifically, the LCD can be divided into a VA area (visual area), an AA area (active area), and a BM area (black matrix). The visible area VA is all visible portions of the LCD panel. The active are AA is a portion that can be programmed to control the display, where VA>AA. The BM area is disposed at an outermost periphery of the VA area. BM is the abbreviation of black matrix. For liquid crystal display panels, the colors come from red, green, and blue color filters (RGB CF). In order to control each individual display unit (such as an R, called a sub-pixel), there are control signal traces between the sub-pixels and the edge area. In order to prevent the wiring from affecting the display effect, the area except for the pixels (the three sub-pixels of RGB are collectively referred to as pixels) is made as the black matrix area.

A primary function of the black matrix area is to prevent light leakage from the screen. When the LCD liquid crystal panel is powered on, we can see a clear image because an internal backlight emits light. The role of the black matrix area at this time is to prevent light from leaking from the edge of the LCD panel. That is, the size of the black matrix area determines the size of the pixel's light transmission, which in turn changes the size of a pixel. In addition, the black matrix area has another function that is used for wiring of data signals and scan signals. Adjusting the size of the data line can also change the size of the pixel's light transmission, thereby changing the size of a pixel. Therefore, by adjusting the size of the black matrix area or the data line, each pixel can be adjusted to the corresponding target value.

S105, if the pixel value of the edge area is not adjusted from the first pixel value to the second pixel value, the first display image of the first display screen and the second display image of the second display screen are determined according to the first pixel value, the second pixel value, the first display area, the second display area, and the image to be displayed.

Specifically, if the pixel value of the edge area is not adjusted from the first pixel value to the second pixel value (that is, the pixel value of all areas of the first display screen is the first pixel value), it is necessary to adjust the size of the pixel unit that actually displays the image to be displayed on the first display screen and the second display screen to improve the display effect difference caused by the pixel difference. For example, the pixel value of the first display screen (LCD55FHD) is 630*630 um, the pixel value of the second display screen (mini-LED) is 900*900 um. By enlarging the image to be displayed to 1.5 times, the original LCD is 1 RGB to display one pixel point of the image to be displayed, and it becomes 1.5 RGB to display one pixel point of the image to be displayed. The mini-LED is still 1 RGB pixel to display one pixel point of the image to be displayed. Thus, the pixel values of the LCD and the LED is the same in terms of display effect. That is, the 1920*1080 pixels of LCD55FHD can only display 2/3 of the original image. In this way, the pixel size of the mini-LED can be the same as that of the LCD. Based on the point-to-point display characteristics of the first display screen and the second display screen, if the pixel ratio is a ratio of the larger pixel value to the smaller pixel value, the pixel ratio is greater than or equal to 1.

Based on the pixel ratio, the display mode of the first display screen or the second display screen has been adjusted. For example, the 1920*1080 pixels of LCD55FHD in the above example can only display 2/3 of the original image. All the first display screens and the second display screens cooperate to display a complete image to be displayed. The image to be displayed needs to be divided into blocks based on the first display area of the first display screen and the second display area of the second display screen. Therefore, it is necessary to divide the image to be displayed into blocks by further introducing the pixel ratio.

Figure 4:
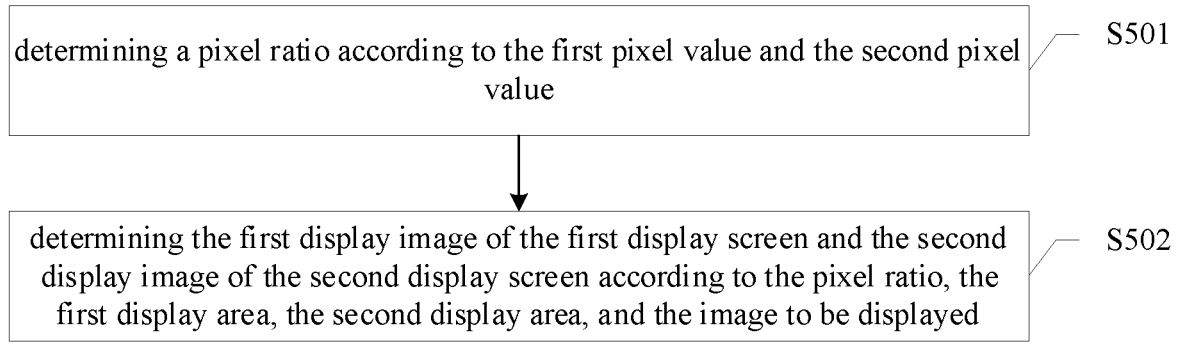
FIG. 4 is a flowchart of a method for eliminating a splicing gap of splicing screens in another embodiment of the present disclosure.

In one embodiment, as shown in FIG. 4, this step includes: S501, a pixel ratio is determined according to the first pixel value and the second pixel value; S502, the first display image of the first display screen and the second display image of the second display screen are determined according to the pixel ratio, the first display area, the second display area, and the image to be displayed.

Specifically, if the pixel size is not changed from a hardware design level, the size of the pixel unit that actually displays the image to be displayed on the first display screen and the second display screen can be adjusted to improve the display effect difference caused by the pixel difference.

The pixel unit refers to the number of RGB of the first display screen and the second display screen that need to be used to display one pixel point of the image to be displayed. For example, if 1.5 RGB is used in the first display screen to display one pixel point of the image to be displayed, the pixel unit of the first display screen is 1.5. It should be noted that, based on the point-to-point display characteristics of the first display screen and the second display screen, the number of pixel unit is greater than or equal to 1, and cannot be less than 1. The pixel ratio is determined according to the first pixel value and the second pixel value. When the pixel unit of one of the first display screen and the second display screen is limited to 1, and the pixel ratio is limited to the ratio of the larger pixel value to the smaller pixel value, the pixel ratio is the same size as the pixel unit of the other display screen.

In addition, the pixel ratio depends on the minimum division of pixels on the first display screen and the second display screen, that is, how many RGB of the first display screen and the second display screen need to be used to display one pixel point of the image to be displayed. In order to facilitate the calculation, the pixel ratio can be taken as an integer according to certain preset requirements. For example, before adjustment, the first display screen uses an RGB to display one pixel point of the image to be displayed. After adjustment, the first display screen uses 1.5 RGB to display one pixel point of the image to be displayed. Finally, combine the first display area of the first display screen and the second display area of the second display screen to divide the image to be displayed into to blocks, the first display image of the first display screen and the second display image of the second display screen are determined.

Figure 5:
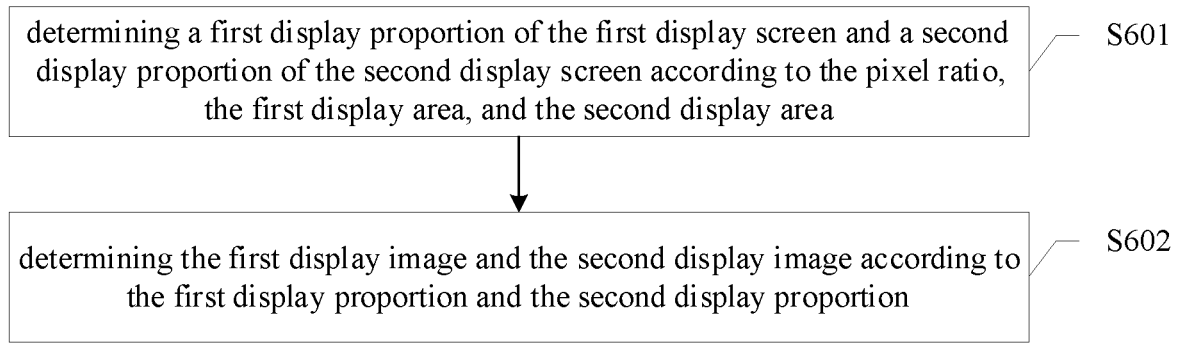
FIG. 5 is a flowchart of a method for eliminating a splicing gap of splicing screens in another embodiment of the present disclosure.

In one embodiment, as shown in FIG. 5, the step S502 of determining the first display image of the first display screen and the second display image of the second display screen according to the pixel ratio, the first display area, the second display area, and the image to be displayed includes: S601, a first display proportion of the first display screen and a second display proportion of the second display screen are determined according to the pixel ratio, the first display area, and the second display area; S602, the first display image and the second display image are determined according to the first display proportion and the second display proportion.

Specifically, based on the pixel ratio, the display mode of the first display screen or the second display screen has been adjusted. For example, the 1920*1080 pixels of LCD55FHD in the above example can only display 2/3 of the original image. Thus, based on the pixel ratio, the size of the image actually displayed on the first display screen or the second display screen varies. The first display proportion of the first display screen and the second display proportion of the second display screen are determined according to the pixel ratio, the first display area, and the second display area. The first display proportion and the second display proportion refer to the proportion of the image that can be displayed by the corresponding display screen in the image to be displayed.

The first display proportion of the first display screen and the second display proportion of the second display screen depend on the number of all first display screens and second display screens spliced in the display device. Thus, the display proportion ratio of the first display screen and the second display screen is first determined according to the pixel ratio, the first display area, and the second display area, and then the number of display screens of all the first display screens and second display screens spliced in the display device is obtained. The first display proportion and the second display proportion are determined according to the number of display screens and the display proportion ratio.

For example, the first display area of the first display screen is 36 mm*48 mm. The second display area of the second display screen is 6 mm*48 mm. The pixel ratio is the ratio of the second pixel value to the first pixel value, and the pixel ratio is 1.5. Thus, the display proportion ratio of the first display screen and the second display screen is 4:1. If the display device includes two first display screens and one second display screen, the display proportion ratio of the three screens is 4:1:4. The corresponding first display proportion of the first display screen is 4/9, and the second display proportion of the second display screen is 1/9.

It should be noted that this embodiment is described by taking the smallest display unit composed of the first display screens and the second display screen in the display device as an example. In fact, the display device may include different numbers of the first display screens and the second display screens based on different display requirements. If all the first display screens are the same and all the second display screens are the same, the display proportion ratio of any one of the first display screen and the second display screen is analyzed, and then the first display proportion and the second display proportion are determined based on the number of display screens. If there are different first display screen or second display screen, the display proportion ratio of the first display screen and the second display screen is calculated according to the above process. Each type of the first display screen and the second display screen is included, that is, different first display screen and second display screen are used as an object to calculate the display proportion ratio, and finally the first display proportion and second display proportion are determined based on the number of display screens.

According to the first display proportion and the second display proportion, the first display image and the second display image are determined. It should be noted that since the display device is displayed by splicing the first display screens and the second display screens of multiple pieces, it is necessary to obtain an arrangement of all the display screens in the display device. Refer to the arrangement, the first display proportion, and the second display proportion, and the image to be displayed is divided into blocks to determine the first display image of each first display screen and the second display image of each second display screen.

S106, the first display screen is controlled to display the first display image, and the second display screen is controlled to display the second display image.

Specifically, the first display screen is controlled to display the first display image, and the second display screen is controlled to display the second display image. All the display screens of the display device ca be marked. The first display image of each first display screen and the second display image of each second display screen are determined to be marked with the same identification information on the corresponding display image, so that the respective display image can be quickly determined during display.

The display image of one of the first display screen and the second display screen with the smaller pixel value needs to be enlarged according to the pixel ratio, and then it is displayed by the display screen with the smaller pixel value. For example, the pixel value of the first display screen (LCD55FHD) is 630*630 um, and the pixel value of the second display screen (mini-LED) is 900*900 um, and the pixel ratio is 1.5. The LCD is changed to using 1.5 RGB to display one pixel point of the image to be displayed, the mini-LED is still using 1 RGB to display one pixel point of the image to be displayed. At the same time, the first display area of the LCD is 36 mm*48 mm, the second display area of the LED is 6 mm*48 mm, and the display proportion ratio of the LCD and the mini-LED is 4:1. The display device includes two first display screens and one second display screen, the display proportion ratio of the three screens is 4:1:4. The corresponding first display proportion of the LCD is 4/9, and the second display proportion of the mini-LED is 1/9. The first display image of mini-LCD is 4/9 of the image to be displayed. In order to achieve one pixel point of the image to be displayed with 1.5 RGB in the LCD, the first display image, that is, the 4/9 of the image to be displayed, needs to be enlarged by 1.5 times, and then displayed on the LCD.

It should be noted that, due to the different light-emitting principles of the LCD and the LED, there are differences in brightness and chromaticity. When spliced together, the effect of complete fusion cannot be achieved. Therefore, it is necessary to adjust the brightness, chroma, and other parameters of the first display image and the second display image respectively to adjust it to the preset display state, so that the two display effects are the same. The preset display state can be set according to the parameters of the display and user experience, which is not specifically limited in this embodiment.

In this embodiment, the size of the edge pixels of the LCD can be designed to gradually change from large to small or from small to large to weaken the visual difference at the splicing gap of the LCD and the mini-LED. In addition, through a video processor software, the pixels of the LCD can be enlarged or reduced to match the pixels of the LED to achieve the same resolution of the LCD and the mini-LED.

Figure 6:
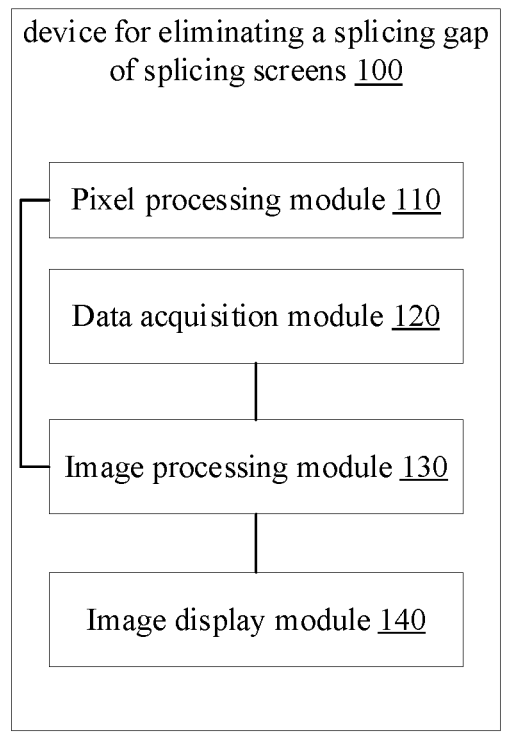
FIG. 6 is a schematic diagram of a device for eliminating a splicing gap of splicing screens in an embodiment of the present disclosure.

In order to better implement the method for eliminating the splicing gap of the splicing screens in the embodiments of the present disclosure, on the basis of the method for eliminating the splicing gap of the splicing screens, an embodiment of the present disclosure also provides a device for eliminating a splicing gap of splicing screens. As shown in FIG. 6, a device 100 for eliminating a splicing gap of the splicing screens includes the following.

a pixel processing module 110 configured to acquire a first pixel value of a first display screen and a second pixel value of a second display screen, where the second display screen is adjacent to the first display screen;

a data acquisition module 120 configured to acquire an image to be displayed, to acquire a first display area of the first display screen and a second display area of the second display screen;

an image processing module 130 in communication connection with the pixel processing module 110 and the data acquisition module 120 and configured to if a pixel value of an edge area is adjusted from the first pixel value to the second pixel value according to a preset configuration parameter along an extension direction of the first display screen to the second display screen, determine a first display image of the first display screen and a second display image of the second display screen according to the first display area, the second display area, and the image to be displayed, where the edge area is an area in the first display screen and adjacent to the second display screen; if the pixel value of the edge area is not adjusted from the first pixel value to the second pixel value, determine a first display image of the first display screen and a second display image of the second display screen according to the first pixel value, the second pixel value, the first display area, the second display area, and the image to be displayed;

an image display module 140 in communication connection with the image processing module 130 and configured to control the first display screen to display the first display image, and control the second display screen to display the second display image.

In some embodiments of the present disclosure, the image processing module 130 is also configured to determine a pixel ratio according to the first pixel value and the second pixel value; and determine the first display image of the first display screen and the second display image of the second display screen according to the pixel ratio, the first display area, the second display area, and the image to be displayed.

In some embodiments of the present disclosure, the image display module 140 is also configured to control one of the first display screen and the second display screen with a larger pixel value to display a corresponding display image; and enlarge the display image corresponding to one of the first display screen and the second display screen with a smaller pixel value according to the pixel ratio, and control one of the first display screen and the second display screen with the smaller pixel value to display.

In some embodiments of the present disclosure, the image processing module 130 is also configured to determine a first display proportion of the first display screen and a second display proportion of the second display screen according to the pixel ratio, the first display area, and the second display area; and determine the first display image and the second display image according to the first display proportion and the second display proportion.

In some embodiments of the present disclosure, the image processing module 130 is also configured to determine a display proportion ratio of the first display screen and the second display screen according to the pixel ratio, the first display area, and the second display area; acquire a number of display screens of the first display screen and the second display screen; determine that first display proportion of the first display screen and the second display proportion of the second display screen according to the display proportion ratio and the number of the display screens.

In some embodiments of the present disclosure, the image processing module 130 is also configured to calculate a pixel difference value of the first pixel value and the second pixel value; determine the edge area according to preset pixel value intervals and the pixel difference value; and adjust a size of a pixel of the edge area from the first pixel value to the second pixel value according to the preset pixel value intervals along the extension direction of the first display screen to the second display screen.

In some embodiments of the present disclosure, the preset pixel value intervals are set at even intervals.

In some embodiments of the present disclosure, the preset pixel value intervals are set at random intervals.

In some embodiments of the present disclosure, the image processing module 130 is also configured to increase the size of the pixel of the edge area from the first pixel value to the second pixel value according to the preset pixel value intervals along the extension direction of the first display screen to the second display screen; or decrease the size of the pixel of the edge area from the first pixel value to the second pixel value according to the preset pixel value intervals along the extension direction of the first display screen to the second display screen.

In some embodiments of the present disclosure, the image processing module 130 is also configured to determine a target value of each pixel in the edge area according to the preset pixel value intervals, the first pixel value, and the second pixel value; and adjust each pixel to the target value.

In some embodiments of the present disclosure, the image processing module 130 is also configured to adjust each pixel to the target value by adjusting a size of a black matrix area or a data line.

In some embodiments of the present disclosure, the image display module 140 is also configured to adjust parameters of the first display image and the second display image to a preset display state.

In some embodiments of the present disclosure, the image display module 140 is also configured to determine a ratio of the first display screen to the second display screen according to the first display area and the second display area; acquire a number of display screens of the first display screen and the second display screen; and determine the first display image of the first display screen and the second display image of the second display screen according to the ratio and the number of the display screens.

In the above-mentioned embodiments, the description of each embodiment has its own focus. For parts that are not described in detail in an embodiment, reference may be made to related descriptions of other embodiments.

An embodiment of the present disclosure also provides a display device. The display device includes a plurality of first display screens. A splicing gap is formed between two of the first display screens. The display device further includes a second display screen disposed at the splicing gap and a device for eliminating a splicing gap of splicing screens as mentioned above. The device for eliminating the splicing gap of the splicing screens is connected to the first display screen and the second display screen. The device for eliminating the splicing gap of the splicing screens executes the method for eliminating the splicing gap of the splicing screens described in the foregoing embodiments to eliminate the splicing gap between the first display screen and the first display screen.

In some embodiments, the first display screen is a liquid crystal display (LCD) display screen, and the second display screen is a mini-LED display screen.

In some embodiments of the present disclosure, an electronic device is provided, including one or more processors; a memory; and one or more application programs, wherein one or more application programs are stored in the memory and configured to execute the steps of the method for eliminating the splicing gap of the splicing screens described above by the processor. Here, the steps of the method for eliminating the splicing gap of the splicing screens may be the steps in the method for eliminating the splicing gap of the splicing screens in each of the foregoing embodiments.

The technical features of the above embodiments can be combined arbitrarily. In order to make the description concise, all possible combinations of the technical features in the above embodiments are not described. However, as long as there is no contradiction in the combination of these technical features, it should be regarded as the scope of this specification.

The method for eliminating the splicing gap of the splicing screens and the display device of the embodiment of the present disclosure are described in detail above. Specific examples are used in this specification to illustrate the principle and implementation of the present invention. The description of the above embodiments is only used to help understand the method and core idea of the present invention.

At the same time, for those skilled in the art, according to the idea of the present invention, there will be changes in the specific implementation and the scope of application. In summary, the content of this specification should not be construed as a limitation of the present invention.

What is claimed is:

1. A method for eliminating a splicing gap of splicing screens, comprising:
   acquiring a first pixel value of a first display screen and a second pixel value of a second display screen, wherein the second display screen is adjacent to the first display screen, and the first pixel value and the second pixel value are respectively a size of a single pixel in the first display screen and the second display screen;
   acquiring an image to be displayed;
   acquiring a first display area of the first display screen and a second display area of the second display screen;
   if a pixel value of an edge area is adjusted from the first pixel value to the second pixel value in a manner gradually changing from large to small or from small to large according to a preset configuration parameter along an extension direction of the first display screen to the second display screen, determining a first display image of the first display screen and a second display image of the second display screen according to the first display area, the second display area, and the image to be displayed, wherein the edge area is an area in the first display screen and adjacent to the second display screen;
   if the pixel value of the edge area is not adjusted from the first pixel value to the second pixel value, determining a pixel ratio according to the first pixel value and the second pixel value;
   determining the first display image of the first display screen and the second display image of the second display screen according to the pixel ratio, the first display area, the second display area, and the image to be displayed;
   adjusting parameters of the first display image and the second display image to a preset display state; and
   controlling the first display screen to display the first display image, and controlling the second display screen to display the second display image.

2. The method for eliminating the splicing gap of the splicing screens according to claim 1, wherein the step of determining the first display image of the first display screen and the second display image of the second display screen according to the pixel ratio, the first display area, the second display area, and the image to be displayed comprises:
   determining a first display proportion of the first display screen and a second display proportion of the second display screen according to the pixel ratio, the first display area, and the second display area; and
   determining the first display image and the second display image according to the first display proportion and the second display proportion.

3. The method for eliminating the splicing gap of the splicing screens according to claim 1, wherein the step of adjusting the pixel value of the edge area from the first pixel value to the second pixel value according to the preset configuration parameter along the extension direction of the first display screen to the second display screen comprises:
   calculating a pixel difference value of the first pixel value and the second pixel value;
   determining the edge area according to preset pixel value intervals and the pixel difference value; and
   adjusting a size of a pixel of the edge area from the first pixel value to the second pixel value according to the preset pixel value intervals along the extension direction of the first display screen to the second display screen.

4. The method for eliminating the splicing gap of the splicing screens according to claim 3, wherein the step of adjusting the size of the pixel of the edge area from the first pixel value to the second pixel value according to the preset pixel value intervals comprises:
   determining a target value of each pixel in the edge area according to the preset pixel value intervals, the first pixel value, and the second pixel value; and
   adjusting each pixel to the target value.

5. The method for eliminating the splicing gap of the splicing screens according to claim 4, wherein the step of adjusting each pixel to the target value comprises:
   adjusting each pixel to the target value by adjusting a size of a black matrix area or a data line.

6. A method for eliminating a splicing gap of splicing screens, comprising:
   acquiring a first pixel value of a first display screen and a second pixel value of a second display screen, wherein the second display screen is adjacent to the first display screen, and the first pixel value and the second pixel value are respectively a size of a single pixel in the first display screen and the second display screen;
   acquiring an image to be displayed;
   acquiring a first display area of the first display screen and a second display area of the second display screen;
   if a pixel value of an edge area is adjusted from the first pixel value to the second pixel value in a manner gradually changing from large to small or from small to large according to a preset configuration parameter along an extension direction of the first display screen to the second display screen, determining a first display image of the first display screen and a second display image of the second display screen according to the first display area, the second display area, and the image to be displayed, wherein the edge area is an area in the first display screen and adjacent to the second display screen;
   if the pixel value of the edge area is not adjusted from the first pixel value to the second pixel value, determining the first display image of the first display screen and the second display image of the second display screen according to the first pixel value, the second pixel value, the first display area, the second display area, and the image to be displayed; and
   controlling the first display screen to display the first display image, and controlling the second display screen to display the second display image.

7. The method for eliminating the splicing gap of the splicing screens according to claim 6, wherein the step of determining the first display image of the first display screen and the second display image of the second display screen according to the first pixel value, the second pixel value, the first display area, the second display area, and the image to be displayed comprises:
   determining a pixel ratio according to the first pixel value and the second pixel value; and
   determining the first display image of the first display screen and the second display image of the second display screen according to the pixel ratio, the first display area, the second display area, and the image to be displayed.

8. The method for eliminating the splicing gap of the splicing screens according to claim 7, wherein the step of controlling the first display screen to display the first display image, and controlling the second display screen to display the second display image comprises:
   controlling one of the first display screen and the second display screen with a larger pixel value to display a corresponding display image; and
   enlarging the display image corresponding to one of the first display screen and the second display screen with a smaller pixel value according to the pixel ratio, and controlling one of the first display screen and the second display screen with the smaller pixel value to display.

9. The method for eliminating the splicing gap of the splicing screens according to claim 7, wherein the step of determining the first display image of the first display screen and the second display image of the second display screen according to the pixel ratio, the first display area, the second display area, and the image to be displayed comprises:
   determining a first display proportion of the first display screen and a second display proportion of the second display screen according to the pixel ratio, the first display area, and the second display area; and
   determining the first display image and the second display image according to the first display proportion and the second display proportion.

10. The method for eliminating the splicing gap of the splicing screens according to claim 9, wherein the step of determining the first display proportion of the first display screen and the second display proportion of the second display screen according to the pixel ratio, the first display area, and the second display area comprises:
   determining a display proportion ratio of the first display screen and the second display screen according to the pixel ratio, the first display area, and the second display area;
   acquiring a number of display screens of the first display screen and the second display screen;
   determining that first display proportion of the first display screen and the second display proportion of the second display screen according to the display proportion ratio and the number of the display screens.

11. A display device, comprising a plurality of first display screens, and a splicing gap formed between two of the first display screens, wherein the display device further comprises a second display screen disposed at the splicing gap and a device for eliminating a splicing gap of splicing screens as claimed in claim 7, and the device for eliminating the splicing gap of the splicing screens is connected to the first display screen and the second display screen.

12. The display device according to claim 11, wherein the first display screen is a liquid crystal display (LCD) display screen, and the second display screen is a mini-LED display screen.

13. The method for eliminating the splicing gap of the splicing screens according to claim 6, wherein the step of adjusting the pixel value of the edge area from the first pixel value to the second pixel value according to the preset configuration parameter along the extension direction of the first display screen to the second display screen comprises:
   calculating a pixel difference value of the first pixel value and the second pixel value;
   determining the edge area according to preset pixel value intervals and the pixel difference value; and
   adjusting a size of a pixel of the edge area from the first pixel value to the second pixel value according to the preset pixel value intervals along the extension direction of the first display screen to the second display screen.

14. The method for eliminating the splicing gap of the splicing screens according to claim 13, wherein the preset pixel value intervals are set at even intervals.

15. The method for eliminating the splicing gap of the splicing screens according to claim 13, wherein the preset pixel value intervals are set at random intervals.

16. The method for eliminating the splicing gap of the splicing screens according to claim 13, wherein the step of adjusting the size of the pixel of the edge area from the first pixel value to the second pixel value according to the preset pixel value intervals comprises:
   increasing the size of the pixel of the edge area from the first pixel value to the second pixel value according to the preset pixel value intervals along the extension direction of the first display screen to the second display screen; or
   decreasing the size of the pixel of the edge area from the first pixel value to the second pixel value according to the preset pixel value intervals along the extension direction of the first display screen to the second display screen.

17. The method for eliminating the splicing gap of the splicing screens according to claim 13, wherein the step of adjusting the size of the pixel of the edge area from the first pixel value to the second pixel value according to the preset pixel value intervals comprises:
   determining a target value of each pixel in the edge area according to the preset pixel value intervals, the first pixel value, and the second pixel value; and
   adjusting each pixel to the target value.

18. The method for eliminating the splicing gap of the splicing screens according to claim 17, wherein the step of adjusting each pixel to the target value comprises:
   adjusting each pixel to the target value by adjusting a size of a black matrix area or a data line.

19. The method for eliminating the splicing gap of the splicing screens according to claim 6, wherein before the step of controlling the first display screen to display the first display image, and controlling the second display screen to display the second display image, the method comprises:
   adjusting parameters of the first display image and the second display image to a preset display state.

20. The method for eliminating the splicing gap of the splicing screens according to claim 6, wherein the step of determining the first display image of the first display screen and the second display image of the second display screen according to the first display area, the second display area, and the image to be displayed comprises:
   determining a ratio of the first display screen to the second display screen according to the first display area and the second display area;
   acquiring a number of display screens of the first display screen and the second display screen; and
   determining the first display image of the first display screen and the second display image of the second display screen according to the ratio and the number of the display screens.

* * * * *